United States Patent [19]
Andrews et al.

[11] Patent Number: 6,155,084
[45] Date of Patent: Dec. 5, 2000

[54] PROTECTIVE ARTICLES MADE OF A COMPOSITE FABRIC

[75] Inventors: Mark A. Andrews; Gregory V. Andrews, both of Concord; James B. Miles, Kannapolis, all of N.C.

[73] Assignee: World Fibers, Inc, Concord, N.C.

[21] Appl. No.: 08/948,635

[22] Filed: Oct. 10, 1997

Related U.S. Application Data

[60] Provisional application No. 60/028,317, Oct. 11, 1996, and provisional application No. 60/028,319, Oct. 11, 1996.

[51] Int. Cl.$^7$ .............. D04B 7/34; D04B 9/58; A41D 13/08
[52] U.S. Cl. ............... 66/174; 66/202; 66/65; 2/16
[58] Field of Search .................. 66/174, 202, 16, 66/158, 159, 161.1, 161.6, 167, 65; 2/455, 456, 16, 154, 161.6, 167

[56] References Cited

U.S. PATENT DOCUMENTS

| | | | |
|---|---|---|---|
| 2,899,812 | 9/1959 | Attenborough | 66/176 |
| 4,004,295 | 1/1977 | Byrnes et al. | 2/16 |
| 4,768,234 | 9/1988 | Yamamoto | 2/16 |
| 4,779,289 | 10/1988 | Prouty | 2/16 |
| 5,187,815 | 2/1993 | Stern et al. | 2/16 |
| 5,210,877 | 5/1993 | Newman | 2/227 |
| 5,224,363 | 7/1993 | Sutton | 66/174 |
| 5,231,700 | 8/1993 | Cutshall | 2/167 |
| 5,442,815 | 8/1995 | Cordova et al. | 66/174 |
| 5,564,129 | 10/1996 | Manne | 2/167 |

*Primary Examiner*—Danny Worrell
*Attorney, Agent, or Firm*—Christopher C. Dremann

[57] ABSTRACT

Protective articles that provide an unprecedented level of safety and comfort are made of a composite fabric in a continuous, one-step process. The composite fabric incorporates two or more dissimilar yarns or materials, such as thermoplastics, elastomers, metals and other materials not commonly viewed as textiles, each having dissimilar mechanical properties and characteristics that provide optimum protection against the threats of injury associated with a particular application. The continuous, one-step manufacturing process overcomes the disadvantages of the existing labor intensive, costly process of piecing together a protective article from a plurality of separate fabrics made of different materials. Thus, the invented process is both cost effective and minimizes the inefficient use of a heavy weight fabric in regions of the article where exceptional protection is not critical to avoid the accompanying loss of tactile sensitivity and increase in the stiffness and rigidity of the article. In preferred embodiments, the article is a protective garment, such as a glove or a sleeve, which is made of a composite fabric comprising at least one region including a cut-resistant yarn or material and at least one other region including a yarn or material designed to provide tactile sensitivity, or to provide protection against the harmful effects of electromagnetic energy (such as is emitted from wireless communication devices), chemical exposure, abrasion, repetitive motion injury, blunt instrument trauma and cumulative trauma injury from exposure to, for example, vibration.

20 Claims, 5 Drawing Sheets

PROTECTIVE ARTICLES MADE OF A COMPOSITE FABRIC

CROSS REFERENCES TO RELATED APPLICATIONS

This application claims the benefit of U.S. Provisional Application No. 60/028,317 and U.S. Provisional Application No. 60/028,319, both filed on Oct. 11, 1996.

FIELD OF THE INVENTION

The present invention relates generally to protective articles that provide an unprecedented level of safety and comfort. More particularly, the invention relates to protective apparel made of a composite fabric and to a continuous, one-step process for manufacturing protective articles made of a composite fabric.

BACKGROUND OF THE INVENTION

The manufacture of protective articles, such as apparel, requires the use of one of many different materials depending upon the specific threat which the apparel is designed to protect against. One of the common uses for protective apparel is to provide cut and puncture resistance from knives and other sharp instruments. Protective apparel is also commonly used to shield the wearer against excessive heat or flame which can cause severe burn injury. Likewise, protective apparel is also commonly used to insulate the wearer against excessive cold or wind which can cause severe hypothermia or frost bite injury. Furthermore, protective apparel is also useful in protecting workers from the harmful effects of electromagnetic energy (such as is emitted from wireless communication devices), chemical exposure, abrasion, repetitive motion injury, blunt instrument trauma, and cumulative trauma injury from exposure to, for example, vibration.

Over the years, those skilled in the art have designed a substantial number of protective garments to protect workers against these, and other, threats of injury. Each of the prior protective garments, however, was developed to counter a particular threat. For example, cut-resistant gloves were developed to protect a wearer's hand from cuts inflicted by sharp surfaces such as knife blades. These same gloves, however, provide little or no protection from other threats of injury such as excessive temperatures, electromagnetic energy emissions, chemical exposure, abrasion, repetitive motion injury, blunt instrument trauma and cumulative trauma from exposure to, for example, vibration.

Workers are often exposed simultaneously to multiple threats of injury while on the job. A common example occurs in the meat processing industry where a worker is exposed simultaneously to sharp instruments, extremely cold temperatures and harmful chemicals. To counteract each of these threats of injury, a worker typically wears three different pairs of gloves, each pair to protect against a different threat of injury. The first pair, for example, may be liner gloves to keep the hands warm. Gloves made of a cut-resistant material may then be worn over the liner gloves to guard against cuts from the sharp instruments used in meat processing operations. Finally, gloves made of a waterproof material are frequently worn over the cut-resistant gloves to keep the worker's hands dry and free from exposure to the harmful chemicals used in meat processing operations.

Another problem that is encountered with protective apparel designed to counteract a single threat of injury is that generally a heavy weight fabric must be used to obtain a higher degree of protection from threats such as fire or laceration. While offering more protection, apparel made from a heavier fabric typically lacks tactile sensitivity, and thus can impede the worker's ability to properly perform a required task. Consequently, it is very common for workers who are provided with protective garments made from a heavier fabric to avoid using the protective apparel because it restricts the freedom of movement necessary for them to accomplish the tasks they are required to perform. For example, surgeons and other medical personnel infrequently use cut-resistant liner gloves despite the availability of such gloves since the late 1980's. Instead, they elect to forego the protection from cuts afforded by such gloves because the protective garments made from existing cut-resistant materials impair tactile sensitivity and limit manual dexterity. This decision is consciously made on a daily basis by these individuals despite their full knowledge of the serious health risks presented by blood-borne pathogens.

Another common problem is that protective apparel which is designed to protect a worker from one particular threat of injury, is often used in applications requiring protection from a different or multiple threats of injury. Frequently, consumers of protective apparel select a product which addresses their most troublesome safety concern. In doing so, however, they sacrifice safety in one or more other areas of concern. As a consequence workers are left unprotected, or underprotected, from the dangers associated with these secondary safety concerns.

For example, in the meat processing industry, workers are required to wear cut-resistant apparel due to the extremely sharp cutting instruments used in meat cutting operations. Among other garments, meat processing workers utilize cut-resistant gloves and cut-resistant sleeves to protect themselves from being injured by the sharp cutting instruments. Over the past several years, the trend in the meat processing industry has been to substitute lightweight cut-resistant materials for the high performance cut-resistant materials previously utilized to reduce fatigue and repetitive motion injury caused by the use of heavy gloves and sleeves. The lightweight materials also improve the tactile sensitivity of the gloves. The consequence of this substitution, however, has been a reduction in the degree of cut resistance provided by the protective apparel. Thus, an improvement in the secondary characteristics of the protective apparel has been made at the expense of the primary objective of the apparel to overcome lesser problems that are inherent with the particular application.

While the above example is intended to point out the most obvious failure of the state of the art protective apparel, there is a yet a greater and more common failure. In many industries or work-related activities that are not as closely regulated, workers consciously choose to not wear protective apparel of any kind because the available protective garments create difficulties which the workers perceive are greater than the threat of injury that the garment was designed to overcome. Simply put, if a worker cannot effectively and efficiently perform the tasks required of him because of a restriction introduced by a protective garment, he is likely to elect to forego the benefit of the protective garment altogether.

There are many other reasons why workers and other individuals do not utilize conventional protective apparel. Among these are:

(a) Overheating. In certain work environments, an individual can become overheated when wearing existing protective apparel designed to counteract a particular threat of injury which requires the use of a heavy weight fabric. Naturally, if a worker is uncomfortable wearing a protective garment, he will frequently forego the use of the garment. This is particularly true if the garment is being worn over a large area of the body to protect only a relatively small area, such as the use of a glove to protect the tip of only one finger of the hand.

(b) Fatigue and repetitive motion injury. As previously discussed, conventional protective apparel made of a heavy weight fabric is often rigid and therefore interferes with the freedom of movement of the worker. This impediment to free motion hinders the worker's ability to perform tasks which require dexterity. The rigid fabric may also cause premature fatigue and, worse yet, injury due to repetitive motion. The weight of certain articles of existing protective apparel tends to have a detrimental effect on the worker's endurance, particularly when worn over an extended period of time, such as the entire work shift.

(c) Costs. Employers and self-employed individuals frequently find cost to be a prohibitive factor when deciding whether to buy an expensive protective garment that protects a relatively large area of the body, particularly when only an isolated area of the body requires protection. Brick masons are an excellent example of this phenomenon. A brick mason generally wears out only three areas of protection on a conventional cut-resistant glove; namely, the tip of the thumb, index finger, and middle finger on the hand that handles the bricks. The rest of the glove is merely excess material that is simply thrown away when these areas become worn. This excess material, however, can also be unnecessarily hot and uncomfortable for the wearer.

(d) Inherent material dangers. Frequently, the desirable attributes of a particular protective material are the same attributes that are hazardous or unfavorable to the user. For example, protective apparel having exceptionally high abrasion resistance are often made of a thermoplastic material, such as polyethylene, polypropylene or polyester, and thus also have exceptionally smooth or slippery surfaces. Protective garments made of such thermoplastic materials are often rejected by workers whose jobs require manual dexterity because the slippery surfaces of the garments frequently cause the worker to drop items that he is handling, thus creating spoilage and additional hazards in the work place. Such thermoplastic materials may also have a relatively low melting point, and thus can melt in the presence of accidental exposure to high temperatures or flame. Polyethylene melts at approximately 300° F. and polyester melts at less than about 600° F. Thus, both melt below the temperature generally produced by combustion of flammable materials. When a burn trauma occurs to an individual wearing protective apparel made of these materials, the severity of the burn is often exacerbated by the melting of the material utilized to make the protective garment.

To date, manufacturers of protective apparel have approached resolving the above mentioned problems with primitive techniques that have resulted in limited success. One approach has been to sacrifice the level of performance of the apparel by substituting materials that are less effective for the particular threat of injury, but which avoid the exposure to other threats of injury that are inherent in using the optimum materials for the particular threat. Another approach has been to manufacture protective articles from multiple materials pieced together The lack of success experienced in manufacturing "customized" protective apparel for particular applications is exemplified by the following:

Common work, or chore, gloves for use in gardening, farming and other activities requiring tactile sensitivity and a high degree of abrasion resistance are manufactured by a process that involves multiple steps of creating separate fabrics of different materials and joining the fabrics together, along with a cuff material, to form the glove. The resulting "composite" glove includes the attributes necessary to satisfy all of the threats of injury presented by such activities. The uppermost, or digit portion of the glove, is typically formed of an aramid fabric, such as an ultra high molecular weight extended chain polyethylene, to provide the tactile sensitivity necessary to perform tasks requiring manual dexterity. The central, or palm, portion of the glove is typically formed of a canvas fabric or leather and is sewn to the lower edge of the digit portion of the glove. The canvas fabric or leather of the palm portion provides a good gripping surface which is somewhat abrasion resistant. The lowermost, or cuff, portion of the glove is typically formed of an elastic material and is sewn to the lower edge of the palm portion of the glove. The cuff portion is made of an elastic material to conform tightly to the wrist of the wearer so as to prevent soil or contaminants, such as oil, from coming into contact with the skin on the wearer's hand.

While the above described construction addresses the multiple threats of injury present in a particular application, manufacture of such protective apparel is both labor intensive and costly, and the resulting gloves are heavy and uncomfortable to wear. Further, protective apparel of this type typically undergoes evolutions of development which generally result in the manufacturer sacrificing performance of a given attribute to enhance performance of another attribute. In the particular example given herein, sacrifices are generally made in ductile sensitivity, abrasion resistance and comfort to enhance rigidity, cut resistance and resistance to extreme temperatures and chemicals, thereby resulting in a heavy and cumbersome glove. A worker is less likely, however, to wear gloves that are heavy, uncomfortable and are not optimized to address the particular threat of injury which the worker most often encounters. Thus, the worker is left unprotected, or is left underprotected when he in fact does wear the gloves.

The examples discussed herein are merely a summary of the problems exhibited by the current state of the protective apparel art. Obviously, numerous considerations must be addressed and overcome to produce both functional and optimum protective apparel for a particular application. Thus, a need clearly exists for protective articles made of a composite fabric that provide an unprecedented level of safety and comfort, and for a continuous, one-step process for manufacturing protective articles made of a composite fabric.

SUMMARY OF THE INVENTION

The invention solves many of the problems exhibited by the state of the art protective apparel by selectively incorporating any combination of the full spectrum of materials available for manufacturing protective apparel to produce a protective garment made of a composite fabric that provides an unprecedented level of safety and comfort. In particular, the invention permits the most appropriate materials for a particular application to be selectively combined so that the protective garment provides optimum protection against the threats of injury that are most likely to occur. Further, the invention permits the protective garment to be manufactured in a continuous, one-step process which is both cost effective and minimizes the inefficient use of a heavy weight fabric to avoid the accompanying loss of tactile sensitivity and increase in the stiffness and rigidity of the garment. For example, a garment can be produced according to the invention that is cut and abrasion resistant without including an unacceptably smooth and slippery surface in one region, and provides comfort during exposure to extreme temperatures in another region, while meeting the tactile sensitivity, flame retardant, and elasticity requirements necessary for a particular application.

According to the invention, protective articles are made of a composite fabric consisting of a plurality of materials, such as different yarns, thermoplastics, elastomers, metals and other materials not commonly viewed as textiles, each having dissimilar mechanical properties and characteristics. The protective articles are produced by a continuous, one-step process which overcomes the disadvantages of the existing labor intensive, costly process of piecing together a protective article from a plurality of separate fabrics made of different materials. Consequently, the present invention makes it possible to manufacture protective articles that have previously been impossible to manufacture. Preferably, the plurality of materials are positioned in a corresponding plurality of regions of the article. Thus, protection against multiple threats of injury can be obtained simultaneously in the same cost effective, lightweight protective article.

Preferably, the protective articles produced according to the invention are manufactured using conventional automated knitting, weaving or braiding equipment. For purposes of explanation only, and not by way of limitation, the invention is described herein in relation to conventional automated knitting equipment. Knitting machines are well known in the art and are commonly used to produce protective apparel from a variety of different yarns and other materials having dissimilar mechanical properties and characteristics. With the exception of certain finishing details, such as overedging, the provision of a coating to provide a gripping surface and purely ornamental features, the protective articles made of the composite fabric are tailored to meet the requirements of a particular application or task.

For example, a cut-resistant glove can be made primarily of a lightweight fabric to provide tactile sensitivity, while including a heavy weight fabric in the area of the fingertips (or over the entire length of the finger and thumb stalls) to provide maximum cut resistance in the areas of greatest threat of injury. While most of the glove will be composed of the lightweight fabric, the heavy weight fabric will be utilized in the selected areas that require a high degree of cut resistance. As a consequence, an optimal level of cut resistance is achieved in the area of the fingertips while the remaining areas of the glove provide the wearer with the tactile sensitivity and comfort of a lightweight fabric.

In applications where a particular threat of injury is known to be isolated to one or more areas of the glove, such as the thumb region, using the invented process enables a protective glove to be manufactured that incorporates the most expensive and effective fabric in the thumb area to mitigate the particular threat of injury to the thumb, while incorporating inexpensive and comfortable materials for the remainder of the glove. Manufacturing protective gloves in this manner results in a product which is significantly less costly to produce than existing products, while simultaneously providing a higher degree of safety and comfort to the wearer. The present invention thereby reduces cost and encourages the use of protective apparel, such as gloves.

In an alternate embodiment of the invention, protective garments are manufactured using a lightweight, elastic fabric positioned in the small areas that corresponds to the joints of the fingers, hands, elbow, knee and other parts of the body typically covered by protective apparel. At the same time, a heavy weight fabric providing the most protection against cuts, abrasion, flame, extreme temperatures and harmful chemicals is utilized in the remaining areas of the garment. Accordingly, the garment provides an optimum level of protection without unduly restricting the freedom of movement required to accomplish many work related tasks. Combining a lightweight, elastic fabric with a heavy weight fabric in the same garment affords the unique opportunity to provide the highest level of protection in the threat areas of the garment while providing joint areas that allow the otherwise rigid and stiff garment to move as if it had built-in joints.

A further advantage of the invention illustrated by the above examples is that the effects of premature fatigue and repetitive motion injury are mitigated, while at the same time, the wearer is provided with the highest level of protection against the multiple threats of injury encountered in the particular application. This problem has previously been addressed by manufacturing protective apparel utilizing the lightest weight fabric available that provides the minimum acceptable level of performance throughout the entire garment. This approach sacrifices protection in areas where the highest level of performance is required. By contrast, the present invention sacrifices performance only in the areas where little or no protection is needed.

OBJECTS OF THE INVENTION

Accordingly, the principle object of the present invention is to provide protective apparel that affords an unprecedented level of safety and comfort to the wearer.

Another object of the invention is to provide protective apparel made of a composite fabric incorporating two or more dissimilar yarns or materials that provide optimum protection for a particular application.

Another object of the invention is to provide protective apparel made of a composite fabric and manufactured in a continuous, one-step process which is both cost effective and minimizes the inefficient use of a heavy weight fabric to avoid the accompanying loss of tactile sensitivity and increase in the stiffness and rigidity of the garment.

Another, more particular object of the invention is to provide protective apparel made of a composite fabric that comprises at least one region including a cut-resistant yarn or material and at least one other region including a yarn or material designed to provide, for example, tactile sensitivity.

Another, more particular object is to provide protective apparel made of a composite fabric that comprises at least one cut-resistant region including a cut-resistant yarn or material and at least one other region including a yarn or material designed to provide protection against the harmful effects of electromagnetic energy (such as is emitted from wireless communication devices), chemical exposure, abrasion, repetitive motion injury, blunt instrument trauma and cumulative trauma injury from exposure to, for example, vibration.

BRIEF DESCRIPTION OF THE DRAWINGS

In view of these and other objects which will become more readily apparent as the nature of the invention is better understood, the invention consists in the novel combination and arrangement of parts hereinafter more fully described, illustrated and claimed with reference being made to the attached drawings in which:

DETAILED DESCRIPTION

Figure 1:
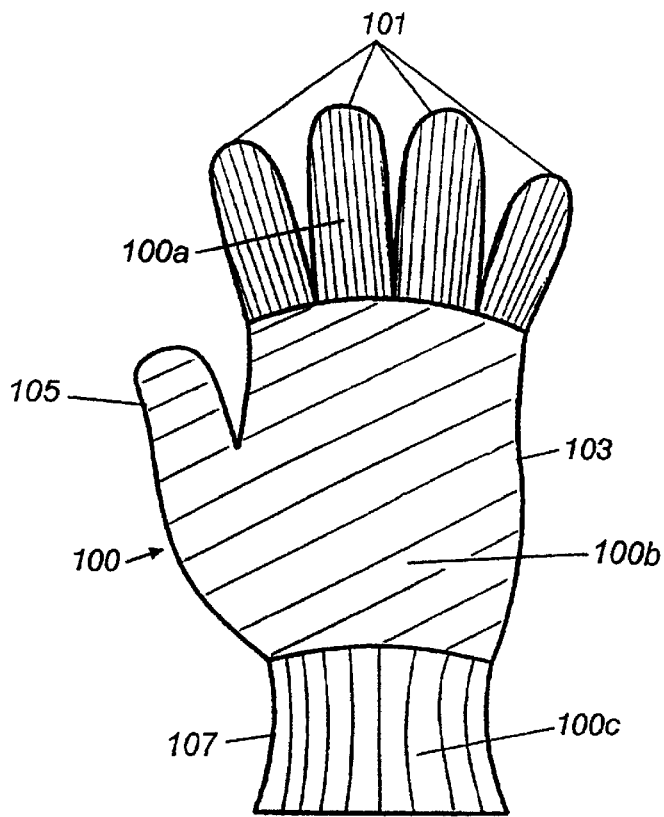
FIG. 1 is a plan view of a first preferred embodiment of a protective article, namely a glove, made of a composite fabric according to the invention.

The present invention is a protective article made of a composite fabric that is manufactured in a continuous, one-step process. The protective article incorporates a plurality of different yarns and materials having dissimilar mechanical properties and characteristics into selected regions of the article to provide attributes that correspond to the performance requirements of that region for a particular application. Specifically, fabrics comprising different yarns and materials are positioned in different regions of the article to provide the user with an unprecedented level of safety and comfort. For example, to achieve optimum performance heavy weight fabrics are positioned only where they are needed so that other, less expensive or lightweight fabrics which provide tactile sensitivity, mobility, and/or comfort can be utilized without sacrificing, for example, cut resistance. The protective articles are produced by a continuous, one-step process which overcomes the disadvantages of the existing labor intensive, costly process of piecing together a protective article from a plurality of separate fabrics made of different materials, while simultaneously minimizing the inefficient use of a heavy weight fabric to avoid the accompanying loss of tactile sensitivity and comfort.

Preferably, the protective articles produced according to the invention are manufactured using conventional automated knitting, weaving or braiding equipment. For purposes of explanation only, and not by way of limitation, the invention is described herein in relation to conventional automated knitting equipment. Knitting machines are well known in the art and are commonly used to produce protective apparel from a variety of different yarns and other materials having dissimilar mechanical properties and characteristics. With the exception of certain finishing details, such as overedging, the provision of a coating to provide a gripping surface and purely ornamental features, the protective articles made of the composite fabric are tailored to meet the requirements of a particular application or task.

In the preferred embodiments of the invention illustrated in the figures, a plurality of fabrics are used to construct the protective article. Depending upon the specific requirements of the article, at least one primary area, or region, of the article is made of a first fabric having mechanical properties or characteristics that are highly desirable for that region of the article. The article is then enhanced by providing at least one secondary region made of a second fabric having mechanical properties or characteristics that are different than those of the first fabric. The secondary regions correspond to regions of the article where the mechanical properties or characteristics of the second fabric are most needed. The use of a plurality of fabrics produces a composite fabric comprising different yarns or materials applied in a corresponding plurality of regions of the article to optimize protection while minimizing the sacrifices associated with protective articles made entirely of a single yarn or material.

In an alternative embodiment, the first fabric applied in the primary region and the second fabric applied in the secondary region are made of the same yarn or material. The weight (also referred to as the density) of the yarn of the second fabric utilized in the secondary region, however, differs from the weight of the yarn of the first fabric utilized in the primary region of the article. Consequently, the secondary region provides different mechanical properties or characteristics, for example enhanced cut resistance, than the primary region. The use of a plurality of fabrics comprising different weights of the same yarn applied in a corresponding plurality of regions of the article optimizes protection while minimizing sacrifices in much the same manner as the use of different yarns or materials previously described.

In yet another alternative embodiment, the secondary region of the article may be an area in which no fabric is present. Such an area, for example, may be the fingertips or the finger and thumb stalls of a protective glove. The use of a fabric comprising a yarn or material in a primary region and no fabric in a secondary region of the article satisfies the requirement for tactile sensitivity or other needs, including but not limited to, providing dexterity and comfort to the wearer, without the accompanying sacrifices in optimum protection in much the same manner as the use of a plurality of fabrics comprising different yarns or materials, or different weights of the same yarn, previously described.

Among the materials that can be used to construct a protective article made of a composite fabric according to the invention are materials consisting of a multiplicity of different fibers combined together to form an enhanced performance fiber for a particular application. These engineered yarns, as they are sometimes referred, may be twisted, wrapped, coated, coextruded, braided, entangled, plied, or blended by spinning or commingling. Such engineered yarns may be used in any of the plurality of regions with other singular yarns, combined yarns or other textile materials. The invention described herein is not limited in scope as to the nature or number of the yarns or materials which may be used in a given embodiment.

The invented protective articles can also be used as a foundation article to produce other articles that cannot be manufactured using automated equipment. Examples include dipped gloves, sewn on patches of auxiliary fabric or other special purpose materials. A coating may also be applied to the article, as well as other treatments that are well known to those skilled in the art of producing protective articles. These and other post production steps may be taken to further enhance the invented article without departing from the spirit of the invention. In this role, the invention eliminates additional steps that are currently required to produce a protective article of specialty manufacture.

Protective articles can also be produced according to the invention that are composed of a shell that is dipped, extruded or calendared in a film that is applied either to the inside or the outside of the fabric and attached by traditional techniques of chemical bonding, heat setting, vacuum bagging or the application of an adhesive. For example, the invented articles can be provided with an antimicrobial membrane, such as a film of polylactic acid (PLA) which includes D-polylactic acid as a antimicrobial agent, or fibers with antimicrobial additives such as those produced by Microban™ of Huntersville, N.C. The membrane may be coated or otherwise impregnated with the antimicrobial agent, or with compounds that include heavy metals, most particularly silver, for protection against microbial organisms.

Furthermore, protective articles according to the invention may be coated with flame retardant emulsions such as expanded vermiculite which is manufactured by the Grace Chemical Company. This may be applied through conventional spraying techniques and other means such as electrostatics, ultrasonics and other known means of preparation. It is within the scope and spirit of the invention disclosed herein that additional materials may be applied to the yarn or the protective article through a variety of processes such as sublimation of particles that may be of many natures. These other materials can be products such as tetra polyfloroethylene ("PTFE"), commonly known as Teflon™ as manufactured by DuPont.

Still further, protective articles according to the invention may include aluminized materials to reflect heat, and most particularly, such articles may include compounds of liquid polymer adhesives that comprise particles that may be metallic or non-metallic in nature and small in size such as aluminum oxide grit, silicon carbide, and other standard hard (above 3 on the Mohs hardness scale) materials. These adhesive polymers may combine chopped fibrous materials of a high strength nature such as particles of liquid crystal polyester, ultra high molecular weight extended chain polyethylene, PBO or PBZT, otherwise known as rigidrod polymer materials, and other such fibrous materials including metallics. The purpose of metallic additives is generally for electromagnetic shielding, puncture resistance and enhanced cut resistance.

Prior to describing preferred embodiments of the invention, it should be noted that literally hundreds of embodiments can be configured from the teachings of the present invention. With this in mind, the preferred embodiments described herein were selected because they solve common and easily illustrated problems. Those skilled in the art will easily recognize how the present invention can be manipulated to create embodiments of a more complex nature as required for the extensive number of applications for which these protective articles can be designed. Thus, any changes or modifications to the preferred embodiments described herein which would be obvious to one of ordinary skill in the protective article art are intended to be equivalents within the spirit and scope of the invention.

A first preferred embodiment of a protective article, namely a glove 100, made of a composite fabric according to the invention is shown in FIG. 1. The glove 100 is configured to offer protection to individuals, such as meat processing workers, who must skillfully handle sharp instruments such as knives and thus are exposed to threats of serious cut injuries. The glove 100 offers the wearer maximum cut resistance in specific areas, or regions, of the glove where the threat of cut injuries is greatest, while simultaneously providing flexibility, mobility and tactile sensitivity in other regions of the glove where superior cut resistance is not required.

Preferably, the glove 100 is manufactured on a seamless glove knitting machine such as is manufactured by the Japanese firm of Shima Seiki, and requires a seven cut knitting machine with an added two color conversion kit. The cut-resistant engineered yarns used in this embodiment are preferably constructed in accordance with the teachings of the U.S. Pat. No. 5,119,512 to Dunbar et. al and assigned to Allied Signal of Morristown, N.J. The Dunbar et. al patent teaches the use of non-metallic abrasive materials such as fiberglass, in concert with cut-resistant yarns, and specifically in conjunction with an ultra high molecular weight extended chain polyethylene referred to herein by the acronym UHMWECP, such as Allied Signal's SPECTRA®. While there are a number of embodiments claimed in the Dunbar et. al patent, UHMWECP SPECTRA® is typically used in the core positioned longitudinally with a strand of fiberglass and wrapped with other materials, including UHMWECP SPECTRA®, in one or more helical covers.

The primary region 100a of the glove 100 covers the fingers 101 of the glove and is made of a fabric comprising three strands of the engineered yarn described in the Dunbar et. al patent. Each strand is comprised of a longitudinal core of 375 denier UHMWECP SPECTRA® combined with a longitudinally positioned secondary core of 100 denier G-450 fiberglass and covered by two helical wraps of 150 denier polyester. The composite denier of this engineered yarn structure is approximately 890 denier. By using three individual strands of this lightweight yarn construction, the primary region 100a is lightweight, soft, flexible, provides tactile sensitivity, and permits the opportunity to add pigments to the polyester covers for product identification and for the safety purposes associated with enhanced visibility of the worker's hand. The polyester covers provide a better gripping surface than UHMWECP SPECTRA®, which has exceptionally high lubricity. The sacrifice of diminished cut resistance made in this region of the glove is offset by the flexibility provided to the glove in this region where exceptional cut resistance is not required.

The secondary region 100b of the glove 100 covers the palm 103 and thumb 105 of the glove, and is made of a fabric comprising two strands of SPECTRA® engineered yarn. Each strand is comprised of a core of 650 denier UHMWECP SPECTRA® with 600 denier G-75 fiberglass and a single wrap cover of 650 denier UHMWECP SPECTRA®. The composite denier of the engineered yarn is 2,750 denier. The resulting fabric of this yarn construction is of exceptionally high cut and abrasion resistance. Although the fabric is somewhat rigid, flexibility, mobility and tactile sensitivity are not as high priorities in the secondary region 100b. Because of its exceptionally high lubricity, the pure UHMWECP SPECTRA® outer cover is somewhat slippery. However, this does not compromise the ability of the worker to handle knives because of the excellent grip surface provided in the primary region 100a which consists of the four fingers. Furthermore the crotch area of the thumb stall is subject to abrasion because the knife handle is constantly placed there. Due to the optimal strength and durability of the UHMWECP SPECTRA® fabric in this region, exceptional durability can be expected from the glove 100 as the knife handle will not easily abrade and wear through the fabric.

The tertiary region 100c of the glove 100 covers the knit wrist cuff 107 of the glove and extends beyond the normal length of a conventional cuff. The tertiary region 100c is made of a fabric comprising a fiber designed primarily for comfort such as THERMAXM™, offered by DuPont. Throughout the tertiary region 100c of the glove 100, additional elastic yarn is typical employed to secure the glove comfortably to the worker's hand. The tertiary portion 100c of the glove 100 can be slid over or under a portion of the cut-resistant sleeves typically worn by workers operating in the meat processing environment. As a result, the cuff conforms more readily to the fabric of the sleeve without the accompanying undesirable chaffing of the skin.

The resulting glove 100 made of a composite fabric according to the invention offers the optimal characteristics for each region 100a, 100b, 100c of the glove. Where cut and abrasion resistance must be sacrificed to obtain optimum flexibility, dexterity, mobility and tactile sensitivity, that sacrifice is limited only to the region of the glove where exceptional cut resistance is not required. In the region of the glove in which the weight and rigidity associated with heavy weight fabrics can be tolerated, such as the thumb and palm, a fabric having exceptional cut and abrasion resistance is used. Consequently, the glove 100 provides optimum cut and abrasion resistance in those areas where it is needed, and optimum flexibility and comfort in areas where lessor resistance to cuts and abrasion can be tolerated. Furthermore, a third fabric comprising an elastic material is provided in the area of the wrist to provide ease of movement, a snug and comfortable fit and a barrier between the worker's skin and the fabric of the cut-resistant sleeve.

Figure 2:
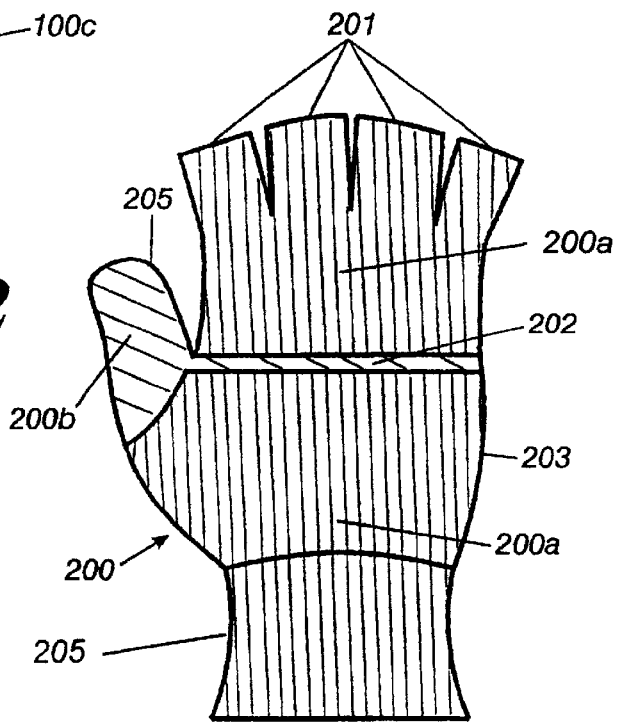
FIG. 2 is a plan view of a second preferred embodiment of a protective article, namely a glove, made of a composite fabric according to the invention.

A second preferred embodiment of a protective article, namely a glove 200, made of a composite fabric according to the invention is shown in FIG. 2. The protective glove 200 is designed to provide optimum protection for workers in industries, such as the floral industry, the produce industry, and the plastic parts forming industry, where objects are trimmed with small knives having sharp blades. In these environments, workers frequently use small razor sharp knives which are held in the hand and pulled towards the thumb in order to cut excess or unsightly materials from the product.

In the floral industry, for example, there are three significant problems that must be addressed by a protective glove. First, employees are working in a cold environment due to the perishable nature of the flowers. Second, the flowers and other materials must be trimmed with a sharp blade creating a cut threat to the thumb of the knife hand. Third, floral arrangements are very delicate and, as a result, a worker handling the flowers must maintain a high degree of tactile sensitivity.

To address these problems, the glove 200 has no fabric covering the four fingers from the knuckle upwards, thereby exposing the worker's fingertips. The primary region 200a of the glove 200 covers the remaining portions 201 of the fingers and extends throughout the palm 203 and knit wrist cuff 205 of the glove. The primary region 200a is preferably formed of a yarn having six strands of 100 denier textured polypropylene.

The secondary region 200b of the glove 200 covers the thumb 205, forming a thumb stall, and extends in a narrow band 202 from the thumb 205 across the palm 203 of the glove 200. It should be noted that the narrow band 202 is present only because it is necessary for the knitting process. The secondary region 200b is a preferably made of a cut-resistant fabric comprised of a single strand of SPECTRA®/glass composite yarn with a total denier weight of 940. This fabric is knitted on a thirteen cut knitting machine which creates a very tight knitted fabric in the secondary region 200b. While the fabric is relatively thin, this UHMWECP SPECTRA®/glass combination is more than adequate for the moderate threat of cut injury.

In this embodiment, the florist has the benefit of open finger stalls which allow full tactile sensitivity to handle fragile articles, such as flowers. The hydrophobic yarn in the primary region 200a of the glove 200 provides warmth and wicks moisture away from the skin of the wearer. The cut-resistant fabric in the secondary region 200b protects the wearer's thumb and a narrow portion of the palm from the sharp edges of the knives. Because the secondary region 200b is essentially isolated to the thumb stall, the percentage of high performance materials in the composite fabric of the glove 200 is low. Thus the glove can be produced at an affordable price while at the same time providing optimum cut resistance and comfort.

As previously described, it is also within the scope of the present invention to coat the primary region 200a of the glove 200 for added protection. In the case of a floral glove, it may be advantageous to apply a layer of PVC based plastisol, polyurethane, silicone or other moisture impervious coating, to form a flexible but tough waterproof coating to the fabric in the primary region 200a of the glove 200 to guard against puncture wounds from the barbs of plants.

Figure 3:
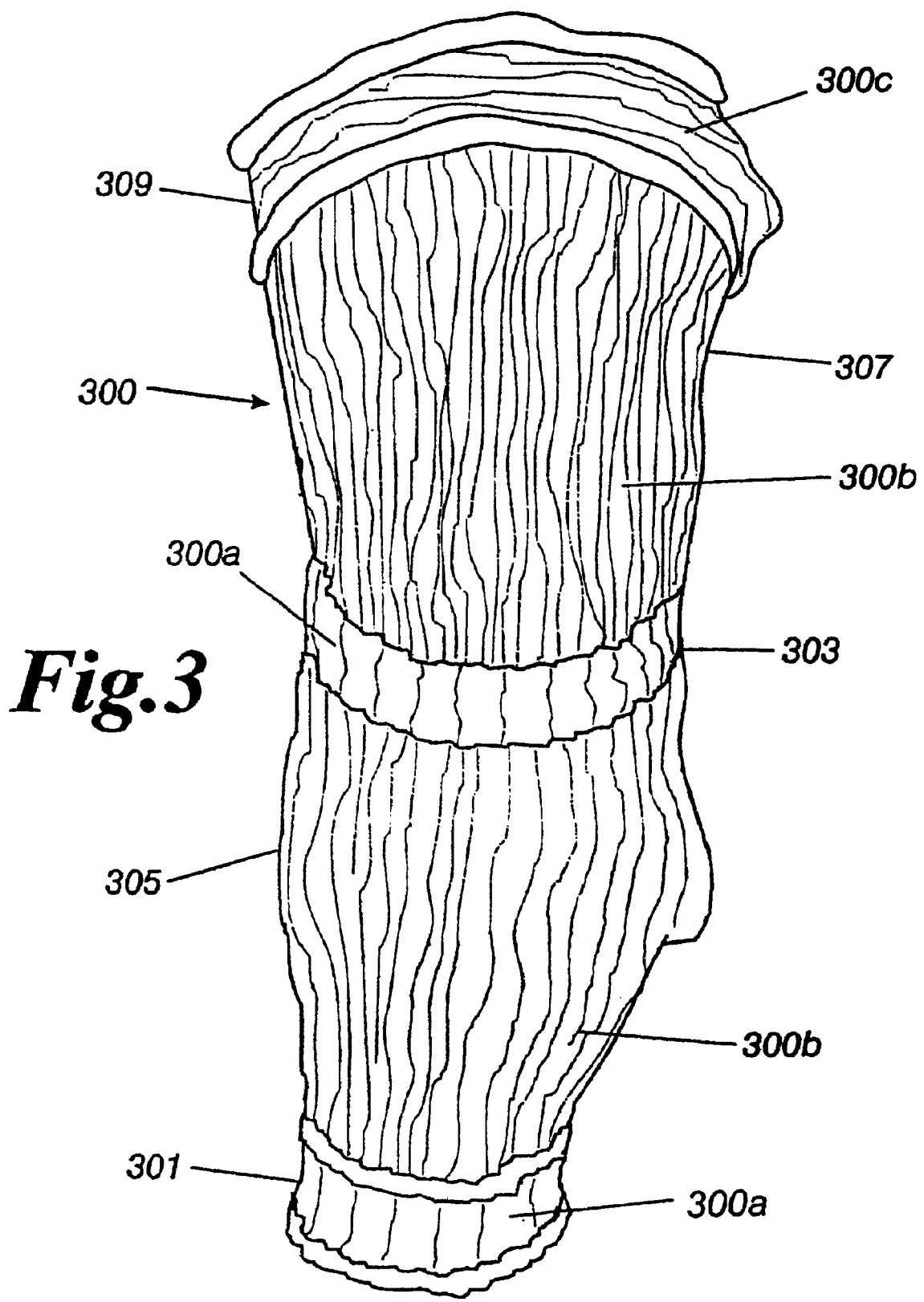
FIG. 3 is a plan view of a third preferred embodiment of a protective article, namely a sleeve, made of a composite fabric according to the invention.

A third preferred embodiment of a protective article, namely a sleeve 300, made of a composite fabric according to the invention is shown in FIG. 3. The sleeve 300 is a tubular knitted protective sleeve of the type generally used to protect an individual's arm or leg from various threats of injury. This embodiment is preferably knit on a seven cut Shima Seki glove knitting machine with a color conversion attachment. It may also be knit on conventional circular knitting equipment such as is commonly used in the hosiery manufacturing trade. The circular knitting machines require a minimum cylinder diameter of approximately four inches, and preferably five to seven inches. These circular knitting machines are capable of applying many types of yarns with what is referred to by those skilled in the art as a "striper attachment."

The overall length of the sleeve 300 is approximately 19 inches. Preferably, the primary region 300a of the sleeve 300 is manufactured of a lightweight cut-resistant fabric comprising a single strand of 1200 denier UHMWECP SPECTRA® wrapped around a 210 denier core of spandex material. The primary region 300a has a lower portion 301 corresponding to the wrist of a wearer which is about two inches in length. The primary region 300a also has an upper portion 303 corresponding to the wearer's elbow which is about two and a half inches in length.

The stretch UHMWECP SPECTRA® primary region 300a of the sleeve 300 allows the wearer maximum freedom of movement. The lower portion 301 of the primary region 300a is positionable under the cuff of a cut-resistant glove. UHMWECP SPECTRA® is a hydrophobic yarn which wicks moisture away from the wearer's skin and prevents chaffing from typical cut-resistant glove fabrics. It also provides additional cut resistance in the area of the wrist. The upper portion 303 of the primary region 300a is also manufactured from the same stretch UHMWECP SPECTRA® fabric as the lower portion 301. This provides the wearer with full freedom of movement in the elbow area as well and separates the two portions of the more rigid secondary region 300b, to articulate much like the joint of the elbow which it protects.

The secondary region 300b of the sleeve 300 has a first portion 305 positioned between the lower portion 301 and upper portion 303 of the sleeve 300 which is about eight inches in length. The secondary region 300b also has a second portion 307 positioned above the upper portion 303 of the sleeve 300 which is approximately four inches in length. The secondary region 300b is made of a fabric comprised of two strands of engineered yarn, each of which has a composite denier of approximately 2400. Each strand is formed of a fibrous longitudinal core with one or more longitudinal strands of 0.003 inch stainless steel wire and one or more strands of filament yarn, such as polyester, wrapped around the core. This two stranded construction, which is preferably manufactured on a seven cut knitting machine, provides an extremely durable cut-resistant fabric which is moderately rigid. In the secondary region 300b where flexibility is not as critical, the sleeve 300 provides significant cut protection against sharp objects.

A tertiary region 300c forms an upper portion 309 positioned above the second portion 307 of the sleeve 300 which is about two and one half inches in length. The tertiary region 300c is manufactured from a fabric comprising a high bulk textured polypropylene filament yarn wrapped around a core of about 200 denier spandex. Preferably, the polypropylene strands are wrapped in opposing directions and have a total weight of about 1200 denier. The polypropylene/spandex tertiary region 300c is designed solely for the comfort of the individual wearing the sleeve 300 in the area closest to the shoulder or hip. Due to its stretch properties, the tertiary region 300c will conform to the contours of the area of the body between the biceps and deltoids allowing the sleeve 300 to cling securely to the wearer's arm or leg. Thus, the tertiary region 300c comfortably secures the sleeve 300 to the arm or leg of the wearer in an area that is most likely to chafe the skin of the wearer and generate excessive body heat.

By forming the sleeve 300 on a reciprocating circular knitting machine, such as those used in hosiery manufacturing, the upper portion 303 of the primary region 300a can be constructed to have additional courses of fabric applied to the back side of the sleeve is in the area of the elbow, similar to the reinforcement provided in the heel of a sock. A garment thus formed will allow even further freedom of movement for the elbow of the wearer. It should also be noted that these reciprocating machines can form additional fabric in the tertiary region of the sleeve 300. Reciprocated knitting creates an additional length of fabric on the outside of the sleeve thereby causing the outside of the sleeve to have a greater length than the inside of the sleeve. This difference in length between the outside and the inside allows the sleeve 300 to better conform to the wearer's anatomy.

Figure 4:
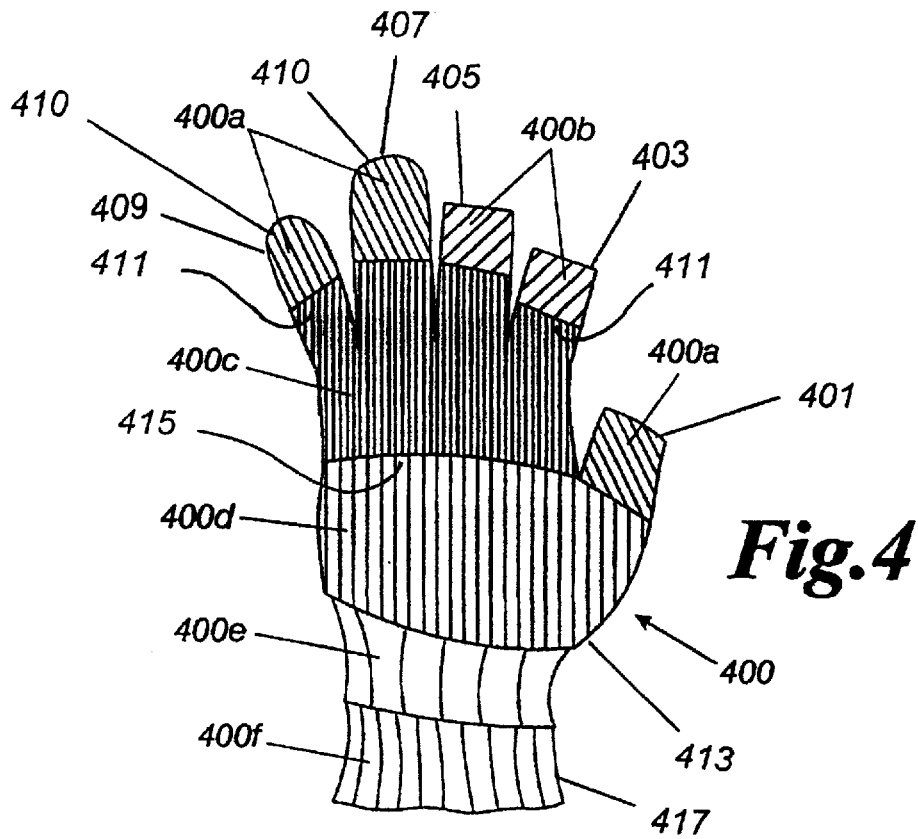
FIG. 4 is a plan view of a fourth preferred embodiment of a protective article, namely a glove, made of a composite fabric is according to the invention.

A fourth preferred embodiment of a protective article, namely a glove 400, made of a composite fabric according to the invention is shown in FIG. 4. The glove 400 is a surgical glove manufactured using a traditional glove knitting machine as discussed in earlier embodiments. Typically, a thirteen cut knitting machine with an attachment called a "knotter," or any of the full line of Shima knitting machines, can be employed when making the glove 400. The knotter attachment gives the machine the additional capability of using six different yarns with a tremendous number of available options, and has been used commercially to manufacture gloves in the fashion apparel industry that utilize multi-colored fabrics for aesthetic purposes.

Medical and emergency personnel are subject to threats of cut injuries from scalpels, the sharp edges of bones, and other sharp objects, such as bullets that they are attempting to remove from patients. Traditionally, medical workers do not wear any protective gloves due to the decrease in tactile sensitivity occasioned by using conventional protective gloves. Existing surgical protective gloves are typically made of a single cut-resistant fabric, such as ultra high molecular weight extended chain polyethylene or a wire based composite engineered yarn. As a result, medical workers who use gloves made of these materials suffer from discomfort associated with heat and moisture being trapped against their skin. The glove 400 illustrated in FIG. 4 overcomes these limitations. Furthermore, by providing a highly elastic fabric to ward off fatigue and minimize the long term effects of carpal tunnel syndrome, the glove 400 enables medical workers to perform delicate work for extended periods of time.

The glove 400 provides maximum tactile sensitivity to the thumb, index, and middle fingers of the wearer of the glove. In particular, no fabric is provided from the fingertips to about one half of an inch down the thumb stall 401, the index finger stall 403 and the middle finger stall 405 of the glove 400. The remaining portion of the thumb stall 401 and the upper portions of the ring finger stall 407 and the little finger stall 409 from the fingertips 410 to about the middle knuckle 411 define a primary region 400a. Primary region 400a is made of a fabric comprising 650 denier UHMWECP SPECTRA® wrapped around a core of about 70 denier spandex. The remaining portions of the index finger stall 403 and the middle finger stall 405 to about the middle knuckle 411 define a secondary region, indicated at 400b in FIG. 4. Secondary region 400b is made of a fabric comprising 375 denier UHMWECP SPECTRA® wrapped about a 70 denier spandex core.

A tertiary region, indicated at 400c in FIG. 4, positioned between the middle knuckle 411 and the upper edge 415 of the palm 413 of the glove 400, is made of a fabric comprising a lightweight, wire based composite yarn having a composite denier of about 700. The wire is 0.002 inch diameter stainless steel with a 300 denier textured polyester core and an outer wrap of 300 denier textured polyester. The palm 413 of the glove 400 defines a fourth region, indicated at 400d in FIG. 4, which is made of a fabric comprising a heavy weight polyester wire composite yarn that contains a strand of 0.002 inch stainless steel wire and a polyester core, with an inner wrap of 0.002 inch stainless steel and an outer wrap of polyester. A fifth region, indicated at 400e in FIG. 4, extends between the palm 413 and the cuff extension 417 of the glove 400 in the area of the knit wrist.

The region 400e of the glove is made of a fabric comprising a single strand of elastic yarn with a core of 210 denier spandex which is double covered with an inner cover of hydrophilic spun yarn, such as cotton. The outer cover is constructed of 300 denier textured polypropylene. The polypropylene is a hydrophobic yarn which will keep the wrist area dry while allowing the inner cover of cotton to absorb the moisture from that area. The spandex core is included primarily to provide wrist support. In addition to the elastic fabric utilized in region 400e, the region 400e contains a conventional spandex yarn with polyester covers that is "laid in" to the knit wrist area. The spandex of this yarn is 540 denier providing exceptional compression for the knit wrist area.

The sixth and final region 400f, which is defined by the cuff extension 417 of the glove, is made of a fabric comprising a stretch hydrophilic material such as cotton which is wrapped around a core of 210 denier spandex. The cotton inner and outer covers are preferably of 2-ply 20's weight. The cuff extension can be extended to any length required to provide the appropriate evaporative surface for adequate cooling.

As is apparent, the preferred embodiment illustrated in FIG. 4 utilizes the most appropriate materials for a medical worker's glove. In areas of the glove where tactile sensitivity is critical, such as region 400a, there is either no fabric, or the lightest weight fabric possible is used. In regions, such as 400c and 400d, where tactile sensitivity and freedom of movement can be sacrificed, heavier weight fabrics providing greater cut resistance are utilized. The region 400d of the palm presents the greatest threat of cut injury and the least requirement for tactile sensitivity and flexibility, therefore a heavier weight and more highly cut-resistant wire based yarn is used in this area. The region 400e of the knit wrist is designed primarily for comfort by mitigating the adverse effects of heat and moisture. Furthermore, region 400e massages the area of the wrist while at the same time adequately supporting it. The region 400f of the cuff extension allows moisture to be wicked into the open where it can evaporate, thus cooling the hand of the wearer.

Figure 5:
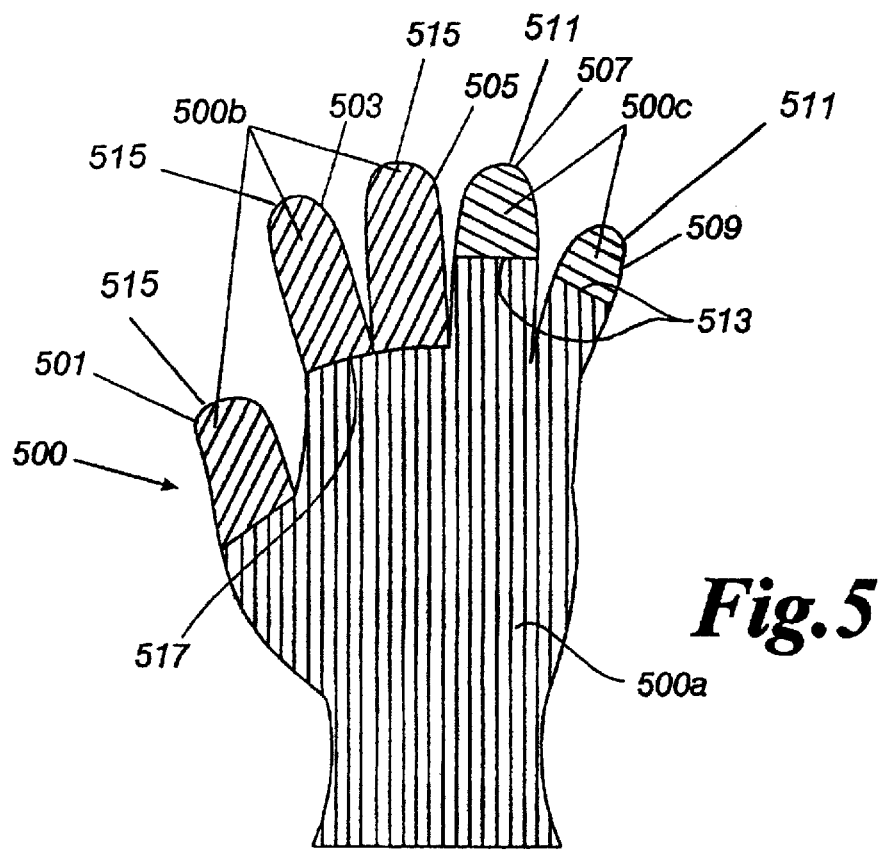
FIG. 5 is a plan view of a fifth preferred embodiment of a protective article, namely a glove, made of a composite fabric according to the invention.

A fifth preferred embodiment of a protective article, namely a glove 500, made of a composite fabric according to the invention is shown in FIG. 5. The glove 500 is useful in a high abrasion environment of the type encountered by a mason. A mason routinely handles brick, block, stone and other building materials that are highly abrasive. Accordingly, the gloves worn by a brick mason typically exhibit wear points on the tips of the first, second and third fingers of the glove which handles the bricks. While there is some abrasion in other areas of the gloves, the bricks are almost always handled and placed by using only these three fingers of the glove.

Masons typically use inexpensive cut and sewn cotton jersey gloves. The gloves are worn until the three fingers of the glove referenced above are worn completely through. The average mason can easily use one pair of gloves each day on the job. After the fingers are worn through on one of the gloves, that glove is discarded and the opposite glove can be worn inside out in a rather uncomfortable fashion. In addition to having high abrasion resistance in the fingertips, the remaining areas of the mason's glove must be made of a comfortable fabric which allows the skin to breathe, while keeping the mason's hand warm on cold days. Tactile its sensitivity, however, is not especially necessary for a brick mason's gloves. Finally, the mason's gloves must be inexpensive.

The glove 500 illustrated in FIG. 5 may be manufactured on a seven cut Shima glove knitting machine. The primary region 500a of the glove 500 covers the majority of the hand and is made of a fabric comprising spun polyester with a weight of approximately six on the cotton count scale. However, the fabric of region 500a is not limited to spun polyester and may be constructed of other spun fibers, filaments or blends thereof. It is generally best that the fiber selected for region 500a be abrasion resistant and hydrophobic while maintaining flexibility at a low cost.

The secondary region 500b of the glove 500 includes only the thumb 501, the index finger 503 and the middle finger 505 and is preferably made of a fabric comprising a composite yarn manufactured with a low shrink, high tenacity, polyester core of about 1000 denier. The core is wrapped with high tenacity abrasion resistant fiber, such as, but not limited to, ultra high molecular weight extended chain polyethylene or liquid crystal polyester. The high tenacity/ abrasion resistant fibers are wrapped in a conventional helical fashion about the core with each layer being of a denier between about 500 to 1000. In the preferred embodiment, each of the layers comprises 650 denier UHMWECP SPECTRA®.

The composite yarn of region 500b is preferably applied in the full length of the thumb 501, the index finger 503 and the middle finger 505 from the fingertips 515 to the base of the thumb and the two fingers. The secondary region 500b of the glove 500 may also be applied to the remaining portions of the ring finger 507 and the little finger 509 from the fingertips 511 down to a position 513 located between the first and the middle knuckle of these fingers. In an alternative embodiment, as shown, the remaining portions of the ring finger 507 and the little finger 509 may define a tertiary region 500c made of a fabric comprising a less expensive and lower performance fiber such as a high tenacity, polyester of 7–9 grams per denier and twisted to a combined weight of approximately 2000 denier. An example of such a fiber is Hoechst Celanese Type 787 Polyester Filament yarn.

The glove 500 has secondary regions 500b, and possibly tertiary regions 500c, made of a fabric comprising more expensive highly abrasion resistant fibers located in those areas of the glove that experience the greatest amount of wear. The primary region 500a of the glove 500, however, is made of a fabric comprising inexpensive, lightweight and comfortable fibers for the body of the glove. Field trials have indicated that in some circumstances the life expectancy of the glove 500 when constructed according to the invention is in excess of one week, which is equivalent to the life expectancy of ten pairs of the conventional brown jersey gloves in use today. Furthermore, the cost of the glove 500 is less than one half the cost of ten conventional brown jersey gloves. The glove 500 is also more comfortable than a conventional cotton jersey glove which retains moisture, thereby keeping the mason's hand damp and hot during use.

Figure 6:
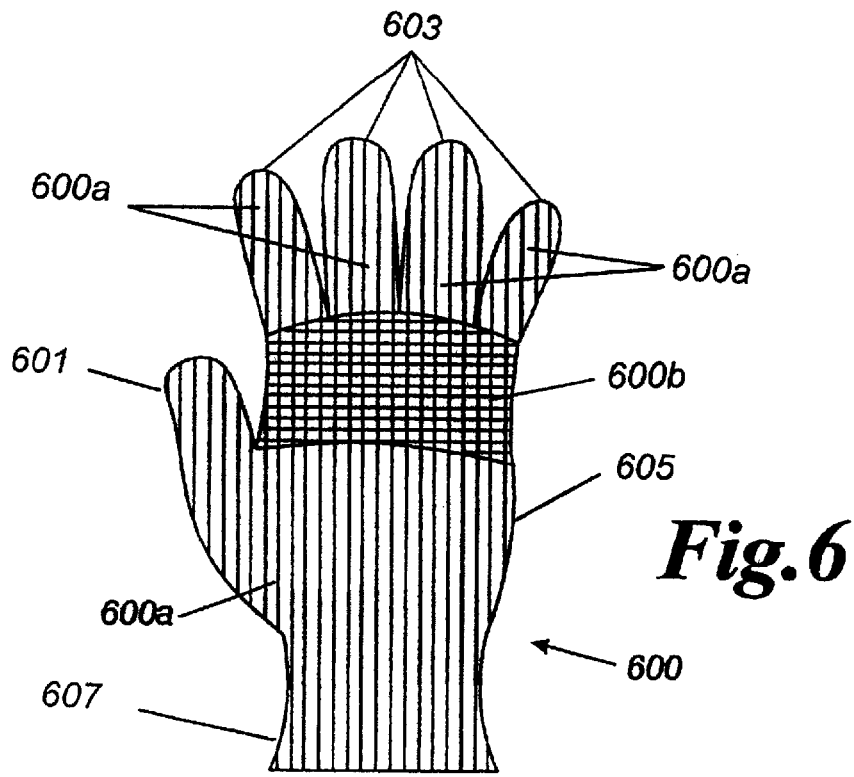
FIG. 6 is a plan view of a sixth preferred embodiment of a protective article, namely a glove, made of a composite fabric according to the invention.

A sixth preferred embodiment of a protective article, namely a glove 600, made of a composite fabric according to the invention is shown in FIG. 6. The glove 600 is desirable for use by persons working with products such as sheet metal, glass and or other materials that require a great deal of cut resistance and abrasion resistance without sacrificing tactile sensitivity. In these applications, the greatest threat of abrasion and cut injury is typically located in the area of the glove between the base of the fingers and the palm. This area is generally where materials are carried and the bulk of the pressure is applied. It is also common for the knuckle area to receive a great deal of abrasion when the individual attempts to manipulate the product into position by putting the weight of their body onto their hand with the knuckles receiving the majority of the ill effects. While working with these products it is necessary to maintain high tactile sensitivity. Thus, it is generally preferred to have a lightweight and comfortable palm and wrist area due to the heat which is generally present in the working environment.

The glove 600 is preferably produced on a ten cut Shima knitting machine. A primary region, indicated at 600a in FIG. 6, of the glove 600 covers the thumb 601 and fingers 603 of the glove as well as the majority of the palm 605 and the cuff extension 607. The primary region 600a is made of a fabric comprising two strands of lightweight UHMWECP SPECTRA®/fiberglass core yarn with wraps of light polyester covering the core. Such a yarn typically has a 100 denier strand of fiberglass along with a strand of 400 denier UHMWECP SPECTRA® in the core. The covers are made of 150 denier polyester wrapped in opposing directions helically about the core at a rate of 10 to 12 turns per inch thereby forming a yarn with a composite denier of approximately 850.

A secondary region, indicated at 600b in FIG. 6, of the glove 600 covers an area between the base of the fingers 603 and extending about one and one half inches (depending upon glove size) in the direction of the palm 605. The secondary region 600b preferably is made of a fabric comprising a second yarn which is highly abrasion and cut-resistant. This second yarn is formed from a single strand of composite yarn with a core of about 900 denier fiberglass and 650 denier UHMWECP SPECTRA®. Also, a single strand of 650 denier UHMWECP SPECTRA® is wrapped about the core at a rate of approximately 8.5 turns per inch. This single strand of yarn creates a substantially dense fabric on a ten cut knitting bed.

In this embodiment, the thumb and fingers of the glove 600 are made of a fabric comprising a lightweight yarn that is comfortable, that provides greater tactile sensitivity, and that provides better gripping ability because of the polyester outer covers. The glove 600 has a lower cost due to its lower percentage of UHMWECP SPECTRA® content. The area requiring more abrasion and cut resistance is constructed of almost pure UHMWECP SPECTRA® with the addition of the fiberglass component in the core to optimize cut performance. This material is more rigid and has higher lubricity. While higher lubricity is not normally conducive to handling materials, because it is located only in the pressure area of glove 600, this material does not adversely affect the ability of the employee to manipulate the product. The palm and knit wrist area are constructed of the same lightweight yarn which allows for increased comfort while reducing the cost of the finished product. The polyester outer covers of the yarn can also be pigmented for different applications which require visual inspection of the hand protection by supervisors and fellow employees, and for other safety or aesthetic reasons.

Figure 7:
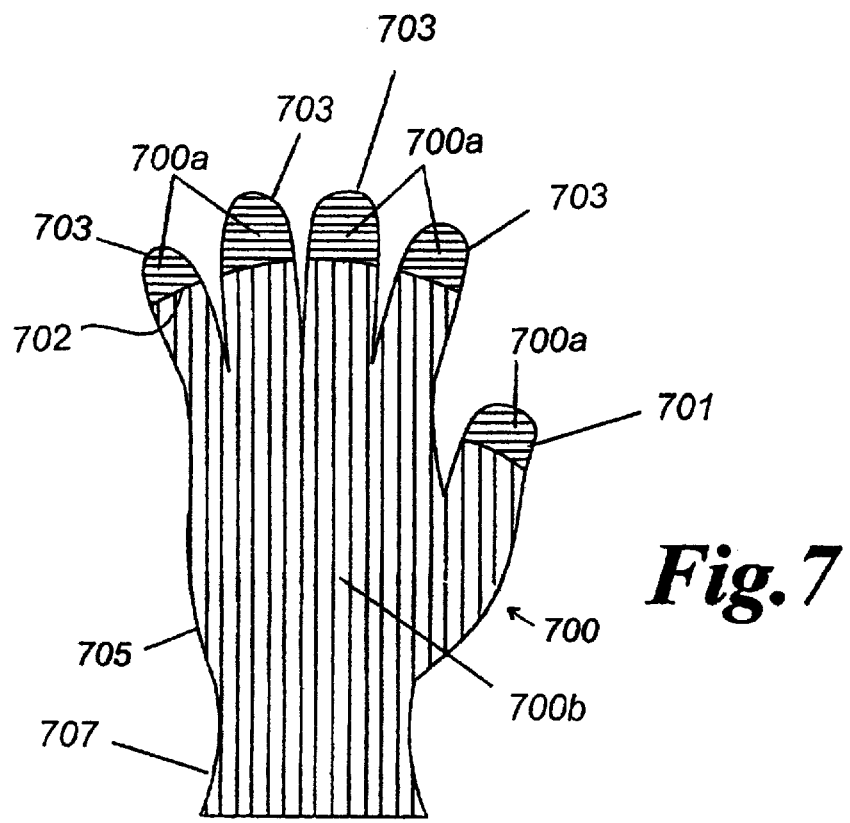
FIG. 7 is a plan view of a seventh preferred embodiment of a protective article, namely a glove, made of a composite fabric according to the invention.

A seventh preferred embodiment of a protective article, namely a glove 700, made of a composite fabric according to the invention is shown in FIG. 7. Preferably, the glove 700 is produced on a seven cut, Shima glove knitting machine for use in a high temperature application. In applications where there is a threat of injury from excessive heat or flame, there are tradeoffs similar to those made with the protective articles previously described. The tradeoffs are typically freedom of movement of the hand which prevents premature fatigue and the requirement for good tactile sensitivity, against maintaining a sufficient level of thermal protection. Selection of proper protection is based on the threat to the employee that is perceived to be the greatest. If the need for tactile sensitivity is perceived to be greatest, a lightweight, flame retardant fabric is selected. If instead the threat of injury caused by exposure to extreme heat or flame is perceived to the greatest, then it becomes necessary to sacrifice tactile sensitivity and dexterity for greater thermal protection.

As illustrated in FIG. 7, the glove 700 includes a primary region 700a made of a lightweight fabric which covers the thumb 701 and the fingers 703 of the glove from the fingertips to a position 702 located at about the middle knuckle. The lightweight aramid fabric used in the primary region 700a preferably has a weight of three strands of 20/1 on the cotton count scale. A secondary region 700b of the glove 700 covers the remainder of the glove 700 from the middle knuckle of the thumb 701 and the fingers 703 to the palm 705 and knit wrist 707 portions of the glove and is preferably made of a fabric comprising a flame retardant material such as spun aramid fibers. The secondary region 700b may, for example, be made of a fabric comprising the same three stand 20/1 single aramid with an additional strand of single/20 aramid. The addition of the fourth strand of 20/1 aramid results in a heavier weight fabric in the area of the palm 705 and extending outwardly therefrom, thereby providing very high thermal protection for these areas of the glove. Although the fingertips have lower thermal protection, they have significantly higher tactile sensitivity which is desirable in many applications.

Figure 8:
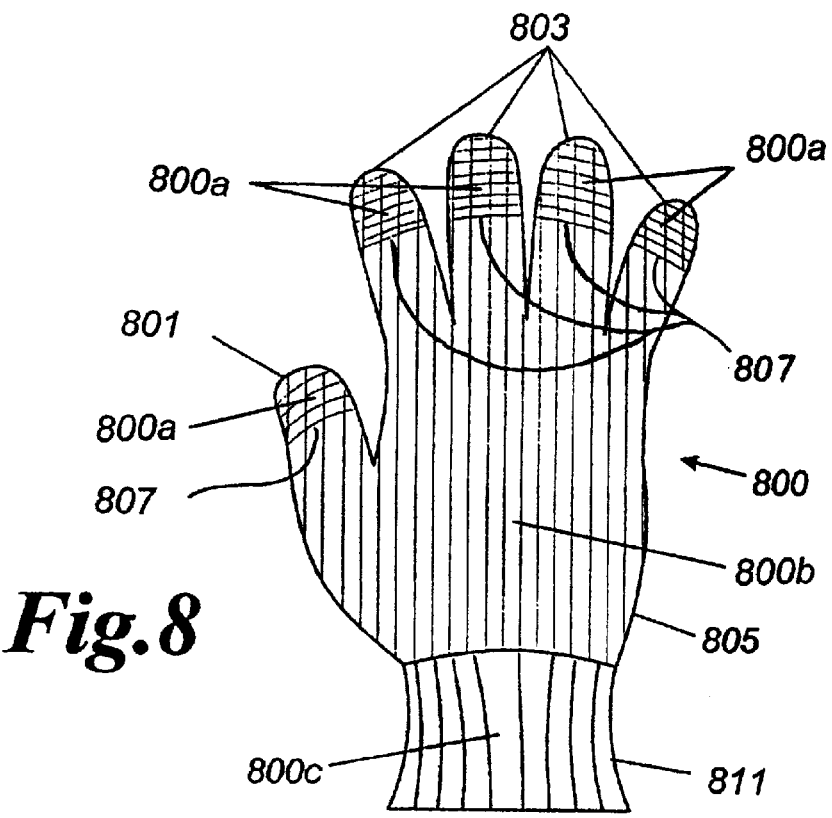
FIG. 8 is a plan view of an eighth preferred embodiment of a protective article, namely a glove, made of a composite fabric according to the invention.

An eighth preferred embodiment of a protective article, namely a glove 800, made of a composite fabric according to the invention is shown in FIG. 8. The glove 800 is a liner glove for use by health care workers and lab technicians who are exposed to threats of cut and stab injuries, but who at the same time require a high degree of tactile sensitivity in their work. The glove 800 may also be manufactured on a Shima glove knitting machine with a thirteen cut needle bed. A primary region 800a covers the tips of the thumb 801 and the fingers 803 and is made of a fabric comprising a single strand of 350 denier UHMWECP SPECTRA® wrapped around a core of 70 denier spandex. The primary region 800a extends from the tips of the thumb 801 and fingers 803 to a position 807 at about the first knuckle on the thumb 801 and each finger 803. A secondary region 800b covers the remaining portion of the glove 800 and is made of a fabric comprising a single stand of 650 denier UHMWECP SPECTRA® wrapped around a core of 70 denier spandex. The secondary region 800b is knit throughout the lower portions of the fingers and extends across the palm 805 to the upper edge of the knit wrist 811 of the glove.

A tertiary region 800c extends outwardly from the knit wrist 811 of the glove 800 adjacent the secondary region 800b. The tertiary region 800c is made of a fabric comprising a third fiber which is selected primarily for elasticity and comfort. This third fiber is typically a hydrophobic yarn such as polypropylene, but preferably is a textured polyester which will withstand repeated sterilization and use more readily. The weight of the textured polyester is about a total of 750 denier and is preferably comprised of five strands of 150 denier textured polyester which have been plied together to form a single, multi-filament thread. The tertiary region 800c also contains an elastic component common to all such gloves. The area of this wrist portion may extend to a length longer than the typical knit wrist glove. The additional length provides further comfort from latex or other synthetic outer glove shells which frequently extend well beyond the wrist up over the arm depending upon the type of outer shell used.

This preferred embodiment represents a more simplistic approach to the same problems associated with the fourth preferred embodiment previously discussed. The fundamental purpose of this embodiment is to provide a reasonable level of cut protection in the area of the fingertips without sacrificing an unacceptable degree of tactile sensitivity. The secondary region 800b of the glove 800 is made of a fabric comprising the heavier weight 650 denier UHMWECP SPECTRA® which provides higher cut resistance while the primary region 800a is made of a fabric comprising a lighter weight fabric that provides increased tactile sensitivity in areas where it is critical. The glove 800 further exploits the use of a material such as polyester in the primary region 800a of the glove 800 where there is less threat from cuts. The primary region 800a, however, is also critical to the comfort of the individual that may be spending long hours wearing an outer shell glove that traps moisture against the skin, thereby generating heat and discomfort.

Figure 9:
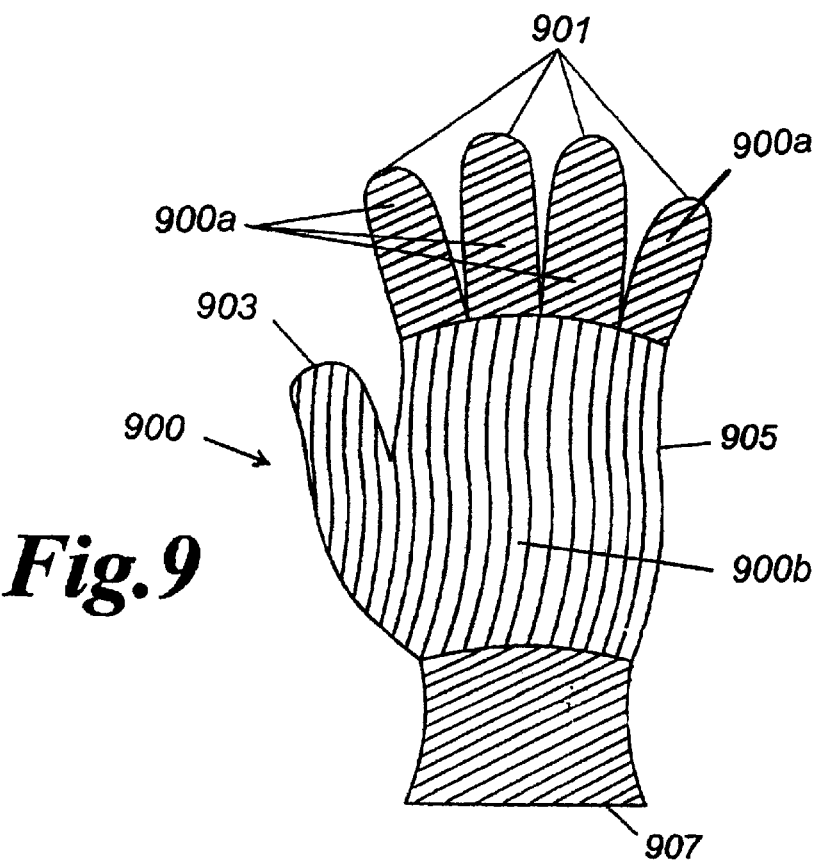
FIG. 9 is a plan view of a ninth preferred embodiment of a protective article, namely a glove, made of a composite fabric according to the invention.

A ninth preferred embodiment of a protective article, namely a glove 900, made of a composite fabric according to the invention is shown in FIG. 9. The glove 900 is a consumer glove which is designed for gardening and other light work, or chores, around the home. The primary region 900a of the glove 900 covers the fingers 901 and is made of a fabric comprising 650 denier UHMWECP SPECTRA® with 105 denier spandex in the core. The secondary region 900b covers the thumb 903 and palm 905 and is made of a fabric comprising an engineered yarn containing 650 denier UHMWECP SPECTRA® and fiberglass in the core, with a 500 denier high strength filament polyester wrapped about the core. The yarn found in the secondary region 900b has a composite denier of 1640. The primary region 900a also covers the knit wrist cuff 907 of the glove 900, which is formed of the same fabric comprising UHMWECP SPECTRA® with spandex in the core used to construct the fingers 901.

The primary region 900a of the glove 900 uses the most lightweight, abrasion resistant materials in the fingers 901 and the knit wrist cuff to provide superior tactile sensitivity and comfort. The secondary region 900b of the glove 900 utilizes thicker, more durable, protective fabrics to provide the greater durability and protection required in the palm 905 and to increase the ability of the wearer to effectively grip items using the palm 905 of the glove 900. The knit wrist cuff 907 is preferably formed of the same fabric as the fingers 901 of the glove 900 to reduce manufacturing cost, but may be formed of any lightweight, hydrophilic material. The knit wrist cuff 907 provides comfort to the wearer by securing the glove 900 tightly to the hand to aid in the prevention of contaminants, such as soil and chemicals, from penetrating the inside of the glove 900 while it is being worn. As with any of the embodiments described herein, the glove 900 can also be manufactured with certain finishing details, such as overedging, the provision of a coating to provide a gripping surface or the provision of a purely ornamental feature.

It should be clear that the present invention provides for a multiplicity of protective articles made of a composite fabric to satisfy a combination of attributes that are required of a given protective article for a particular application. The protective articles made according to the invention can also be used to protect animals and inanimate objects, such as machinery parts. In addition, the articles can be used to protect not only the user of the article from external hazards, but also to protect the surrounding environment from hazards presented by the user.

In the preferred embodiments disclosed herein, fabrics of different yarns and materials can be used to create a protective article, such as a garment, which is made of a composite fabric in a continuous, one-step manufacturing process. These protective garments can address almost a limitless range of potential hazards experienced by the wearer. Some of the yarns and materials available for use include antimicrobial agents, anti-static coatings, high visibility fibers, impact absorbing materials of synthetic or man-made components such as foam neoprene extruded thread, as well as the full range of conventional and unconventional textile materials. These materials may be combined in many ways including, but not limited to, twisting, wrapping, spinning, commingling, coating, coextruding, braiding, entangling and plying.

The shared commonality between the different yarns and materials is limited only to their ability to be knitted or woven into a fabric, and that at least one of the components provide a desired level of protection, such as cut resistance. In the present invention, protective materials are incorporated into selected regions of a protective garment, such as a glove or sleeve, to maximize the performance of the article while minimizing the sacrifices that are typically associated with utilizing a single fabric comprising a protective material throughout the entire garment. Accordingly, the invention provides the opportunity to customize the degree of protection against a variety of threats of injury in selected regions of a single protective garment.

It is to be understood that the foregoing description and specific embodiments are merely illustrative of the best modes of practicing the invention and the principles thereof presently known to the inventors, and that various modifications and additions may be made to the apparatus by those skilled in the art, without departing from the spirit and scope of the invention, which is therefore understood to be limited only by the scope of the appended claims.

What is claimed is:

1. A protective glove made of a composite fabric and continuously knit on a conventional glove knitting machine, said glove comprising
   a primary region defining one or more finger stalls of said glove, said primary region made of a fabric comprising at least one strand of a yarn for providing cut resistance and for providing superior tactile sensitivity relative to the remainder of said glove,
   a secondary region defining the palm and the thumb stall of said glove, said secondary region made of a fabric comprising at least one strand of a yarn for providing superior cut resistance relative to the cut resistance of said primary region; and
   a tertiary region defining the wrist cuff of said glove, said tertiary region made of a fabric comprising at least one strand of a yarn for providing cut resistance not less than the cut resistance of said primary region and not greater than the cut resistance of said secondary region.

2. A protective glove according to claim 1 wherein
   said at least one strand of said yarn of said primary region comprises a first longitudinal core member of ultra high molecular weight extended chain polyethylene combined with a second longitudinal core member of fiberglass and wrapped with a pair of helical wraps of polyester; and
   said at least one strand of said yarn of said secondary region comprises a first longitudinal core member of ultra high molecular weight extended chain polyethylene combined with a second longitudinal core member of fiberglass and wrapped with a single strand of ultra high molecular weight extended chain polyethylene.

3. A protective glove made of a composite fabric and continuously knit on a conventional glove knitting machine, said glove comprising
   a primary region defining one or more finger stall lower portions, a first palm portion and the wrist cuff of said glove, said primary region made of a fabric comprising at least one strand of a yarn for providing cut resistance and superior comfort relative to the remainder of said glove; and
   a secondary region defining the thumb stall and a second palm portion of said glove, said secondary region made of a fabric comprising at least one strand of a yarn for providing superior cut resistance relative to the cut resistance of said primary region.

4. A protective glove according to claim 3 wherein
   said at least one strand of said yarn of said primary region comprises six strands of polypropylene; and
   said at least one strand of said yarn of said secondary region comprises a single strand of ultra high molecular weight extended chain polyethylene/fiberglass.

5. A protective glove according to claim 3 wherein said primary region comprises a moisture impervious coating selected from the group consisting of PVC based plastisol, polyurethane and silicone.

6. A protective sleeve made of a composite fabric and continuously knit on a conventional knitting machine, said sleeve comprising a primary region defining the wrist cuff and the elbow of said sleeve, said primary region made of a fabric comprising at least one strand of a yarn for providing cut resistance and for providing superior flexibility relative to the remainder of said sleeve;

a secondary region defining the lower arm and the upper arm of said sleeve, said secondary region made of a fabric comprising at least one strand of a yarn for providing superior cut resistance relative to the remainder of said sleeve; and a tertiary region adjacent said upper arm of said sleeve opposite said elbow of said sleeve, said tertiary region of said sleeve made of a fabric comprising at least one strand of a yarn for providing superior comfort relative to the remainder of said sleeve and for providing cut resistance not less than the cut resistance of said primary region and not greater than the cut resistance of said secondary region.

7. A protective sleeve according to claim 6 wherein said at least one strand of said yarn of said primary region comprises a longitudinal core of spandex wrapped with a single strand of ultra high molecular weight extended chain polyethylene, said at least one strand of said yarn of said secondary region comprises a first longitudinal core of a fibrous material combined with a second longitudinal core of at least one strand of stainless steel wire and wrapped with at least one strand of polyester; and said at least one strand of said yarn of said tertiary region comprises a first longitudinal core of spandex wrapped with at least one strand of a high bulk textured polypropylene filament.

8. A protective glove made of a composite fabric and continuously knit on a conventional glove knitting machine, said glove comprising a primary region defining the lower portion of the thumb stall, the upper portion of the ring finger stall and the upper portion of the little finger stall of said glove, said primary region made of a fabric comprising at least one strand of a yarn for providing cut resistance and for providing superior tactile sensitivity relative to the remainder of said glove;

a secondary region defining at least the lower portion of the palm of said glove, said secondary region made of a fabric comprising at least one strand of a yarn for providing superior cut resistance relative to the cut resistance of said primary region; and a tertiary region defining at least the lower portion of the ring finger stall, the lower portion of the little finger stall and the upper portion of the palm of said glove, said tertiary region made of a fabric comprising at least one strand of a yarn for providing cut resistance not less than the cut resistance of said primary region and not greater than the cut resistance of said secondary region.

9. A protective glove according to claim 8 wherein said at least one strand of said yarn of said primary region comprises a longitudinal core member of spandex wrapped with at least one strand of ultra high molecular weight extended chain polyethylene;

said at least one strand of said yarn of said secondary region comprises a first longitudinal core of stainless steel wire combined with a second longitudinal core of polyester and wrapped with an inner wrap of stainless steel wire and an outer wrap of polyester; and said at least one strand of said yarn of said tertiary region comprises a first longitudinal core of stainless steel wire combined with a second longitudinal core of polyester and wrapped with an outer wrap of polyester.

10. A protective glove made of a composite fabric and continuously knit on a conventional glove knitting machine, said glove comprising a primary region defining at least the lower portion of the ring finger stall, the lower portion of the little finger stall and the palm of said glove, said primary region made of a fabric comprising at least one strand of a yarn for providing abrasion resistance and for providing superior flexibility relative to the remainder of said glove, and a secondary region defining at least the thumb stall, the index finger stall and the middle finger stall of said glove, said secondary region made of a fabric comprising at least one strand of a yarn for providing superior abrasion resistance relative to the abrasion resistance of said primary region.

11. A protective glove according to claim 10 wherein said at least one strand of said yarn of said primary region comprises spun polyester with a weight of approximately six on the cotton count scale; and said at least one strand of said yarn of said secondary region comprises a longitudinal core of low shrink, high tenacity polyester wrapped with an outer wrap of high tenacity, abrasion resistant fiber selected from the group consisting of ultra high molecular weight extended chain polyethylene and liquid crystal polyester.

12. A protective glove according to claim 10 further comprising a a tertiary region defining the upper portion of the ring finger stall and the upper portion of the little finger stall of said glove, said tertiary region made of a fabric comprising at least one strand of a yarn for providing abrasion resistance not less than the abrasion resistance of said primary region and not greater than the abrasion resistance of said secondary region.

13. A protective glove made of a composite fabric and continuously knit on a conventional glove knitting machine, said glove comprising a primary region defining the thumb stall, the finger stalls and a lower portion of the palm of said glove, said primary region made of a fabric comprising at least one strand of a yarn for providing cut resistance and abrasion resistance and for providing superior tactile sensitivity relative to the remainder of said glove; and a secondary region defining the upper portion of the palm of said glove extending between the lower portion of the palm of said glove and the finger stalls of said glove, said secondary region made of a fabric comprising at least one strand of a yarn for providing superior cut resistance and abrasion resistance relative to the cut resistance and abrasion resistance of said primary region.

14. A protective glove according to claim 13 wherein said at least one strand of said yarn of said primary region comprises a first longitudinal core of ultra high molecular weight extended chain polyethylene combined with a second longitudinal core of fiberglass and wrapped with at least one wrap of polyester; and said at least one strand of said yarn of said secondary region comprises a first longitudinal core of fiberglass and a second longitudinal core of ultra high molecular weight extended chain polyethylene and wrapped with at least one wrap of ultra high molecular weight extended chain polyethylene.

15. A protective glove made of a composite fabric and continuously knit on a conventional glove knitting machine, said glove comprising a primary region defining the upper portion of the thumb stall and the upper portions of the finger stalls of said glove, said primary region made of a fabric comprising at least one strand of a yarn for providing thermal protection and for providing superior tactile sensitivity relative to the remainder of said glove; and a secondary region defining the remainder of said glove, said secondary region made of a fabric comprising at least one strand of a yarn for providing superior thermal protection relative to said primary region.

16. A protective glove according to claim 15 wherein said at least one strand of said yarn of said primary region comprises three strands of aramid having a weight of 20/1 on the cotton count scale; and said at least one strand of said yarn of said secondary region comprises four strands of aramid having a weight of 20/1 on the cotton count scale.

17. A protective glove made of a composite fabric and continuously knit on a conventional glove knitting machine, said glove comprising a primary region defining the upper portion of the thumb stall and the upper portions of the finger stalls of said glove, said primary region made of a fabric comprising at least one strand of a yarn for providing cut resistance and for providing superior tactile sensitivity relative to the remainder of said glove;

a secondary region defining the lower portion of the thumb stall, the lower portions of the finger stalls and the palm of said glove, said secondary region made of a fabric comprising at least one strand of a yarn for providing superior cut resistance relative to said primary region; and a tertiary region defining the wrist cuff of said glove, said tertiary region made of a fabric comprising at least one strand of a yarn for providing elasticity and for providing cut resistance not less than the cut resistance of said primary region and not greater than the cut resistance of said secondary region.

18. A protective glove according to claim 17 wherein said at least one strand of said yarn of said primary region comprises a longitudinal core of about 70 denier spandex wrapped with a single strand of about 350 denier ultra high molecular weight extended chain polyethylene;

said at least one strand of said yarn of said secondary region comprises a longitudinal core of about 70 denier spandex wrapped with a single strand of about 650 denier ultra high molecular weight extended chain polyethylene; and said at least one strand of said yarn of said tertiary region comprises five strands of 150 denier textured polyester plied together to form a single, multi-filament thread.

19. A protective glove made of a composite fabric and continuously knit on a conventional glove knitting machine, said glove comprising a primary region defining the finger stalls and the wrist cuff of said glove, said primary region made of a fabric comprising at least one strand of a yarn for providing abrasion resistance and for providing superior tactile sensitivity and comfort relative to the remainder of said glove; and a secondary region defining the thumb stall and the palm of said glove, said secondary region made of a fabric comprising at least one strand of a yarn for providing superior abrasion resistance relative to said primary region.

20. A protective glove according to claim 19 wherein said at least one strand of said yarn of said primary region comprises a longitudinal core of spandex wrapped with a single strand of ultra high molecular weight extended chain polyethylene; and said at least one strand of said yarn of said secondary region comprises a first longitudinal core of fiberglass combined with a second longitudinal core of ultra high molecular weight extended chain polyethylene and wrapped with a polyester filament.

* * * * *